United States Patent [19]

Brounshtein et al.

[11] 4,366,124
[45] Dec. 28, 1982

[54] APPARATUS FOR DISSOLVING POLYDISPERSE ORES

[76] Inventors: Viktor B. Brounshtein, ulitsa B. Zelenina, 22, kv. 2; Vladimir I. Petrov, ulitsa partizana Germana, 6, kv. 81; Rudolf R. Otsup, ulitsa Burtseva, 22, kv. 92; Galina P. Ignatieva, Murinsky prospekt, 2, kv. 11; Vladlen V. Kozlovsky, Varshavskaya ulitsa, 75, kv. 19; Leonard Y. Lipshits, Sofiiskaya ulitsa, 53, kv. 63; Oleg V. Zhuravlev, Moskovsky prospekt, 79, kv. 156, all of Leningrad; Mikhail G. Koba, ulitsa Ordzhonikidze, 123, kv. 60, Perm; Konstantin B. Seliverstov, Dmitrovskoe shosse, 65, korpus 1, kv. 58; Tamara A. Igisheva, Ivano-v-skaya ulitsa, 18, kv. 31, both of Moscow; Petr A. Drobyazko, prospekt Lenina, 3, kv. 20, Berezniki Permskoi oblasti; Anatoly I. Motin, ulitsa Lenina, 5, kv. 16, Berezniki Permskoi oblasti; Viktor D. Fot, ulitsa Pyatiletki, 48, kv. 9, Berezniki Permskoi oblasti; Lev T. Yakimov, prospekt Lenina, 12. kv. 7, Berezniki Permskoi oblasti; Boris G. Kuznetsov, ulitsa Sergeya Esenina, 14, korpus 2, kv. 33, Leningrad, all of U.S.S.R.

[21] Appl. No.: 173,027
[22] Filed: Jul. 28, 1980
[51] Int. Cl.³ .................. B01D 11/02; B01F 1/00
[52] U.S. Cl. .................. 422/278; 422/284; 422/902
[58] Field of Search .................. 422/261, 27 E, 281, 422/284, 275, 902; 23/293 R; 423/15 E, 65 E, 5

[56] References Cited
U.S. PATENT DOCUMENTS

| | | | |
|---|---|---|---|
| 2,576,315 | 11/1951 | Swartz | 422/278 |
| 3,130,016 | 4/1964 | Grier | 422/261 X |
| 3,164,443 | 1/1965 | Watson | 422/278 |
| 3,468,633 | 9/1969 | Honchar | 422/278 |
| 3,727,889 | 4/1973 | Nagel | 422/261 X |
| 3,998,607 | 12/1976 | Wesselhoft et al. | 423/658.5 X |
| 4,071,611 | 1/1978 | Ghilson | 422/261 X |
| 4,225,563 | 9/1980 | Hasegawa et al. | 423/658.5 X |

Primary Examiner—Bradley Garris
Attorney, Agent, or Firm—Lilling & Greenspan

[57] ABSTRACT

An apparatus for dissolving polydisperse ores comprises a cylindrical housing made up of two coaxial cylinders mounted one above the other, the relation between the diameters and the heights thereof being respectively 1.4–1.6 and 0.5–1.5, which ensures separation of ore particles of a (−1.5 to 0.75) mm size class. A hopper is mounted coaxially with the housing. The apparatus also contains devices for feeding a liquid phase, one of which is located in the lower portion of the housing, and another device, located over the housing's upper cylinder, is provided with nozzles facing the inner surface of the hopper walls. A device for the reduction of horizontal intermixing is made in the form of vertical inserts.

The apparatus is also provided with a device for removal of the solid undissolved component, containing conical traps.

The polydisperse ore and the liquid solvent are fed into the apparatus downwardly and upwardly, the ore being mixed with part of the solvent and being fed to the area with a concentration of the valuable component in the solvent calculated by the formula $$y = \frac{y^* - y_o}{2} k + y_o$$

where
$y^*$ is concentration of the saturated valuable component in the solvent;
$y_o$ is initial concentration of the valuable component in the solvent; and
$k = 0.7\text{--}1.3$, separation of ore particles of a (−1.5 to 0.75) mm size class being maintained by changing the solvent flow rate.

5 Claims, 1 Drawing Figure

U.S. Patent  Dec. 28, 1982  4,366,124
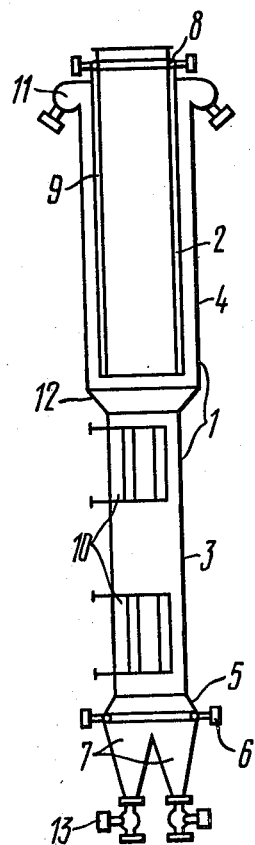

APPARATUS FOR DISSOLVING POLYDISPERSE ORES

FIELD OF THE INVENTION

The invention relates to the branch of chemical engineering engaged in developing apparatus for leaching out and dissolution of polydisperse mineral ores.

Preferably, the apparatus may be used for leaching potassium chloride out of sylvinite ore in the process of producing mineral fertilizers by the halurgical method, and may also be used for recovery by dissolving sodium chloride out of halite and polyhalite ores.

The present invention may also be used for dissolving other mineral ores (carnallite, kieserite), and in related industries whenever necessary for the extraction of a useful component from polydisperse particles dissolved with diffusion.

BACKGROUND OF THE INVENTION

Known in the art is a screw conveyer apparatus for dissolving mineral ores, including sylvinite ore (cf. German Pat. No. 231,582, cl. 12 cl, published on Feb. 21, 1911).

This screw conveyer apparatus represents a trough-shaped container filled with a solution. The inside of the apparatus houses a mixing device in the form of a spiral screw mixer with the end thereof, opposite to the are charging aperture, carrying an elevator with perforated buckets.

Said apparatus operates as follows.

Crushed polydisperse ore, generally of a maximum size class of (−7) mm, is fed into the screw conveyer apparatus to contact the solvent, the solvent being fed either concurrently with or countercurrently to the ore flow. (When separating potassium chloride from sylvinite ore, the solvent is an aqueous solution saturated with sodium chloride and heated to 100°–115° C.).

With the screw conveyer rotating, ore particles are suspended in the solution and fall to the bottom of the apparatus, thereby making potassium chloride pass into solution.

A portion of the settled ore particles is propelled along the bottom of the apparatus by the mixer blades, while another portion is again suspended in the solution.

The undissolved portion of the ore is discharged from the apparatus by means of the elevator with perforated buckets. When dissolving sylvinite ore, the process line is normally provided with three such screw conveyer apparatuses, two of which are intended for the dissolution of sylvinite, while the third one is meant for the recuperation of heat of the undissolved portion of the ore.

However, the screw conveyor apparatus is short-lived due to the fact that salt suspensions featuring high corrosive and abrasive properties add to the wear of the mixing device and the elevator, and also of the apparatus housing proper.

Besides, there is insufficient contact between the portion of the ore lying on the bottom of the apparatus and the solution, which is conducive to reduction of the apparatus capacity.

Also known in the art is a cascade of vertical mixers for dissolving sylvinite ore, manufactured by the West-German "Lurgi" firm.

Operation of each mixer consists in the following.

Sylvinite ore crushed to (−5) mm size class is fed into the mixer concurrently with a hot initial solution. The rotation speed of each mixer in the cascade is selected so as to preclude settling of ore particles on the bottom of the apparatus.

Concurrent delivery of ore and the hot initial solution and also low capacity of each mixer necessitate a whole cascade of 6 to 12 mixers to saturate the solution with the output component. However, such a cascade entails considerable metal and power consumption.

Also known in the art is an apparatus for dissolving mineral ores (cf. U.S. Pat. No. 3,130,016, taken as a prototype.

This apparatus includes a cylindrical housing made in the form of a vertical column, a hopper mounted coaxially therewith, a liquid phase feeding device installed in the column's lower portion, a valve for removal of the solid undissolved component, and an outlet pipe for discharging the final product.

The apparatus operates as follows.

Mineral ore and the initial solution are fed into the apparatus in a counterflow direction to each other, the initial solution flowing upwardly to be saturated with the extracted component and to be subsequently withdrawn through the outlet pipe in the upper part of the apparatus.

The apparatus is provided with a trap for undissolved calcium sulphate, which is disposed below the inlet for the initial solution.

As ore in said prior art apparatus is fed downwardly, the apparatus cannot be used for the dissolution of polydisperse ores.

This is explained by the following considerations. The ore particles pointed out in the above U.S. patent being of a size class of (0.25 to 1.41) mm, an extremely low linear velocity of the upwardly flowing solution is required to keep small undissolved ore particles from being expelled from the apparatus, which conduces to reduction in the capacity of the apparatus. Besides, since the fineness of crushing of mineral ores is limited to a size class of (−5) mm and the (+5) mm class constitutes 5 to 10% at an average size of ore particles of (−2.5) mm > 1.4 mm, the apparatus is practically unusable for the dissolution of sylvinite and halite ores.

SUMMARY OF THE INVENTION

The primary object of the present invention is to provide an apparatus and a method for dissolving polydisperse ores, wherein the housing is made in such a manner and with such correlation of the dimensions, which ensures separation of ore particles of a size class of (−1.5 to 0.75) mm and allows a high degree of extraction and saturation of the solution to be attained at a considerable specific capacity of the apparatus.

Another important object of the present invention is to provide an apparatus for dissolving polydisperse ores, in which a special device would reduce horizontal intermixing, thereby increasing the degree of extraction of the valuable component.

A further object of the present invention is the provision of an apparatus for dissolving polydisperse ores, in which special devices for the introduction of solution in the lower and the upper part thereof would preclude accumulation of undissolved component of the ore in the area of the solution inlet in the lower part of the housing and ensure intermixing of the ore fed into the apparatus with part of the solution in order to avoid crystallization of the solution on the hopper.

Still another object of the present invention is to provide an apparatus for dissolving polydisperse ores, wherein the device for introducing the solution is made and located in a manner precluding accumulation of the undissolved component on the walls and crystallization of the solution on the hopper.

A still further object of the present invention is to provide an apparatus for dissolving polydisperse ores, wherein the device for removal of the solid undissolved component is made and located in a manner ensuring uninterrupted removal of the undissolved component from the apparatus, with minimal losses of the initial solution.

Yet another important object of the present invention is the provision of a method carried out in the apparatus of the invention, wherein the polydisperse ore and the initial solution would mix with such a concentration of the valuable component in the solution and with such a change in the solution flow rate that would ensure a high degree of extraction both from larger particles in the lower counterflow portion of the apparatus and from smaller particles in the upper portion thereof.

These and other objects of the invention are accomplished by an apparatus for dissolving polydisperse ores, including a cylindrical housing, a hopper mounted coaxially therewith, a liquid phase feeding device installed in the lower portion of the housing, and devices for removal of the solid undissolved component and the final product. The housing is made up of two coaxial cylinders mounted one above the other, and the relation between the diameters and the heights thereof being respectively 1.4–1.6 and 0.5–1.5, which ensures separation of ore particles of a (−1.5 to 0.75) mm size class.

Such constructive features allow ore particles of a (−1.5 to 0.75) mm size class to be separated by an upwardly flowing solution, and also enables a high degree of the valuable component extraction to be attained both from larger and smaller particles. Separation of ore particles of the above size class allows the effluent ore of the given granulometric composition to be broken into two equal flows of larger and smaller particles respectively, with a maximum efficiency of the apparatus being attained thereat. For separation, a constant linear velocity of the upwardly flowing solution must be maintained, which is achieved by selecting a suitable relation between the diameters of the upper and the lower portions of the apparatus, said relation being equal to 1.4–1.6. The relation between the heights is determined by the rate of dissolution of larger and smaller ore particles.

It is advantageous that the lower cylinder of the apparatus housing contain a device for reduction of horizontal intermixing, in the form of vertical inserts, which allows horizontal intermixing to be reduced, thereby increasing the degree of extraction of the valuable component.

Besides, it is advantageous that the lower cylinder of the apparatus housing have attached thereto a downwardly expanding sheet-steel drum provided with a device for feeding a liquid phase into the apparatus; and, the top of the upper cylinder supports another device for feeding a liquid phase into the hopper.

Such a design precludes accumulation of the solid undissolved phase in the area of the solution inlet and promotes uniform distribution of the liquid phase throughout the apparatus.

It is also advisable that the device for feeding a liquid phase located on top of the upper cylinder of the apparatus housing be provided with nozzles facing the inner surface of the hopper walls to ensure circulation of the solution in the hopper and preclude crystallization of the solution therein, and also to avoid the likelihood of the ore's finest grains settling on the hopper walls.

It is likewise advisable that the lower part of the sheet-steel drum have attached thereto a device embodying conical traps for the removal of the solid undissolved component.

Due to such a design feature, a high suspension density of the undissolved component is attained and losses of the liquid phase are precluded.

According to the invention, the method is to be performed using the apparatus of the invention by dissolving polydisperse ores in a liquid solvent, fed downwardly and upwardly, and wherein the ore is mixed with part of the solvent and subsequent feeding same to the area with the concentration of the valuable component in the solvent calculated by the formula $$y = \frac{y^* - y_o}{2} k + y^o$$

where
$y^*$ is concentration of the saturated valuable component in the solvent;
$y_o$ is initial concentration of the valuable component in the solvent;
$k = 0.7$ to $1.3$
and separation of ore particles of a (−1.5 to 0.75) mm size class is maintained by changing the solvent flow rate.

As a result, a high degree of extraction is achieved from both larger particles in the lower up-flow and the upper down-flow portions of the apparatus.

DETAILED DESCRIPTION OF THE INVENTION

The invention will now be described by way of example with reference to the accompanying drawing, in which the sole FIGURE of the drawing is a schematic representation of the general view of an apparatus for dissolving polydisperse ores, made in accordance with the invention.

As shown therein, the apparatus for dissolving polydisperse ores contains a housing 1 with a hopper 2 mounted thereon. The housing comprises two coaxial cylinders 3 and 4 mounted one above the other. The diameter of the lower cylinder 3 is 1.4–1.6 times smaller than that of the upper cylinder 4. The lower portion of the apparatus housing 1 contains an expanding sheet-steel drum 5 with a peripherally disposed device 6 to introduce a main flow of a liquid phase, terminating in conical traps 7. To avoid crystallization inside the hopper 2, the upper portion thereof houses a device 8 for feeding a liquid phase, provided with nozzles (not shown) facing the inner surface of the hopper 2. Besides, to prevent crystallization on the outside of the hopper 2, provision is made for a jacket 9 to supply hot steam or solution. The apparatus is also provided with a device 10 for reduction of horizontal intermixing, which may be used as a heat exchanger for heating the solution in the apparatus. A device for removal of the undissolved component is provided with the conical traps 7 and is coupled to the lower portion of the sheet-steel drum 5.

The method of the invention is carried out in the apparatus by having the ore mixed with part of the solvent and delivered to the area having a concentration of the valuable component calcuated by the formula $$y = \frac{y^* - y_o}{2} k + y_o$$

where $y^*$ is concentration of the saturated valuable component in the solvent;

$y_o$ is initial concentration of the valuable component in the solvent; and $k = 0.7$ to $1.3$, and the solvent flow rate is changed to maintain separation of ore particles of a $(-1.5$ to $0.75)$ mm size class.

The apparatus operates as follows.

Polydisperse ore is fed into the apparatus housing 1 through the hopper 2. Separation of particles takes place in the upwardly flowing solution in a separation area 12. Larger particles with the slipping velocity, i.e. the rate of motion relative to the liquid greater than that of the upwardly flowing solution, are dissolved in the lower portion 3 of the apparatus housing 1. Smaller particles are dissolved in the apparatus upper portion 4.

The hopper is filled with the solution with the level thereof determined by the location of the device 11 for removal of the final product.

With a new portion of cold ore passing through the hopper 2, the solution contained therein is saturated, which is likely to cause crystallization inside the hopper.

To avoid this condition, part of the solution is fed together with the ore through the nozzles of the device 8 for feeding the liquid phase, installed over the surface of the solution, the openings of the nozzles facing the walls of the hopper.

The device for removal disposed in the lower part is intended for discharging the undissolved matter residue. For more efficient removal, the lower portion of the apparatus is fitted with conical traps 7 terminating in a regulator 13 which allows a constant level of the undissolved residue to be maintained in said conical traps. The regulator is controlled automatically. To ensure a free flow of ore particles from the lower portion of the apparatus into the conical traps, i.e. to prevent accumulation of particles in the area of the solution inlet, provision is made for the expanding sheet-steel drum 5 with the peripherally disposed perforated pipe 6. With the solution being fed through the openings of the pipe 6, a uniform flow velocity profile is attained. Due to the expanding portion of the drum 5, the flow velocity in the area of the liquid phase (solution) inlet is less than that in the upper down-flow portion of the apparatus, which makes it easier for the particles to pass through the inlet area into the conical traps.

Example of carrying out the method. In dissolving sylvinite ore of the Upper Kama deposit, crushed to a size class of $(-5)$ mm, the particles are separated according to class $(-1)$ mm.

Concentration of RCl in an initial solution—$y_o = 10\%$ (by weight)

Temperature of saturated solution—100° C.

KCl saturating concentration at 100° C.—$y^* = 21.7\%$

The ore mixed with part of the solution is supplied to the area with KCl concentration $y = 16\%$.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. An apparatus for dissolving polydisperse ores, comprising:

a cylindrical housing in the form of two coaxial cylinders mounted one above the other, the relation between the diameters and the heights thereof being respectively 1.4–1.6 and 0.5–1.5, so as to ensure separation of ore particles of a $(-1.5$ to $0.75)$ mm size class;

a hopper mounted coaxially with the housing and into which said polydisperse ores are introduced;

a device for feeding a liquid phase into said apparatus, installed in the lower portion of said cylindrical housing; and devices for removal of the solid undissolved component and the final product.

2. An apparatus as claimed in claim 1, wherein the lower portion of said cylindrical housing contains a device for reduction of horizontal intermixing in the form of vertical inserts.

3. An apparatus as claimed in claim 1, wherein the lower portion of said cylindrical housing has attached thereto a downwardly expanding sheet-steel drum provided with said device for feeding a liquid phase into the apparatus, whereas the top of the upper portion of said cylindrical housing has mounted thereon another device for feeding a liquid phase into the hopper.

4. An apparatus as claimed in claims 1 or 3, further comprising a device for feeding a liquid phase is provided with nozzles facing the inner surface of the hopper walls and located at an upper portion of said housing.

5. An apparatus as claimed in claim 3, wherein the lower part of the sheet-steel drum has attached thereto a device embodying conical traps for removal of the solid undissolved component.

* * * * *